US009038099B2

(12) United States Patent
Velazquez

(10) Patent No.: US 9,038,099 B2
(45) Date of Patent: *May 19, 2015

(54) EMERGENCY ALERT REPRESENTATION

(71) Applicant: AT&T Intellectual Property I, LP, Atlanta, GA (US)

(72) Inventor: Leonardo Velazquez, Plano, IL (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,643

(22) Filed: Oct. 20, 2014

(65) Prior Publication Data
US 2015/0067727 A1  Mar. 5, 2015

Related U.S. Application Data

(63) Continuation of application No. 12/330,046, filed on Dec. 8, 2008, now Pat. No. 8,898,697.

(51) Int. Cl.
H04N 7/10 (2006.01)
H04N 7/025 (2006.01)
H04N 21/81 (2011.01)
H04N 21/258 (2011.01)
H04N 21/643 (2011.01)

(52) U.S. Cl.
CPC ....... *H04N 21/814* (2013.01); *H04N 21/25841* (2013.01); *H04N 21/64322* (2013.01)

(58) Field of Classification Search
USPC .................................................. 725/32–36
See application file for complete search history.

(56) References Cited

U.S. PATENT DOCUMENTS

| | | |
|---|---|---|
| 5,260,778 A | 11/1993 | Kauffman |
| 5,940,776 A | 8/1999 | Baron |
| 7,072,884 B2 | 7/2006 | Kemp |
| 7,119,675 B2 | 10/2006 | Khandelwal |
| 7,194,249 B2 | 3/2007 | Phillips |
| 7,339,467 B2 | 3/2008 | Lamb |
| 2005/0010563 A1 | 1/2005 | Gross |
| 2005/0015803 A1 | 1/2005 | Macrae |
| 2005/0162267 A1 | 7/2005 | Khandelwal |
| 2005/0229206 A1 | 10/2005 | Pugel |
| 2005/0272368 A1 | 12/2005 | Langsenkamp |

(Continued)

OTHER PUBLICATIONS

"Analysis of Emergency Alert Services and Systems", Seong Jong Choi, University of Seoul, S. Korea, Abstract, IEEE, http://ieeexplore.ieee.org/xpl/freeabs_all.jsp?arnumber=4420334.

*Primary Examiner* — Yassin Alata
(74) *Attorney, Agent, or Firm* — Guntin & Gust, PLC; Ralph Trementozzi

(57) ABSTRACT

An emergency alert is received. Information representing a map is generated from emergence alert information identifying an affected area, including a code that identifies a political region and a primitive shape corresponding to the affected area. Customer premises equipment is authenticated and the information representing the map is transmitted for receipt by the customer premises equipment. An indication of a selection of a user-selectable field is received, and in response, a second video stream associated with the emergency and the affected area is transmitted for presentation to customer premises. The first information is displayable as overlay video, providing a map of the affected area and occupying a portion of a display area. The map is displayable together with a user-selectable display field indicating that more information is available in relation to the emergency.

20 Claims, 6 Drawing Sheets

(56) References Cited

U.S. PATENT DOCUMENTS

| | | |
|---|---|---|
| 2006/0020992 A1 | 1/2006 | Pugel |
| 2006/0200842 A1 | 9/2006 | Chapman |
| 2007/0047692 A1 | 3/2007 | Dickinson |
| 2007/0136743 A1 | 6/2007 | Hasek et al. |
| 2007/0146542 A1 | 6/2007 | Strasser |
| 2007/0210910 A1 | 9/2007 | Norstrom |
| 2008/0034114 A1 | 2/2008 | Ducey |
| 2008/0059998 A1 | 3/2008 | McClenny |
| 2008/0092051 A1 | 4/2008 | Sidon |
| 2008/0120639 A1 | 5/2008 | Walter |
| 2008/0162667 A1 | 7/2008 | Verma |
| 2009/0291630 A1 | 11/2009 | Dunn |

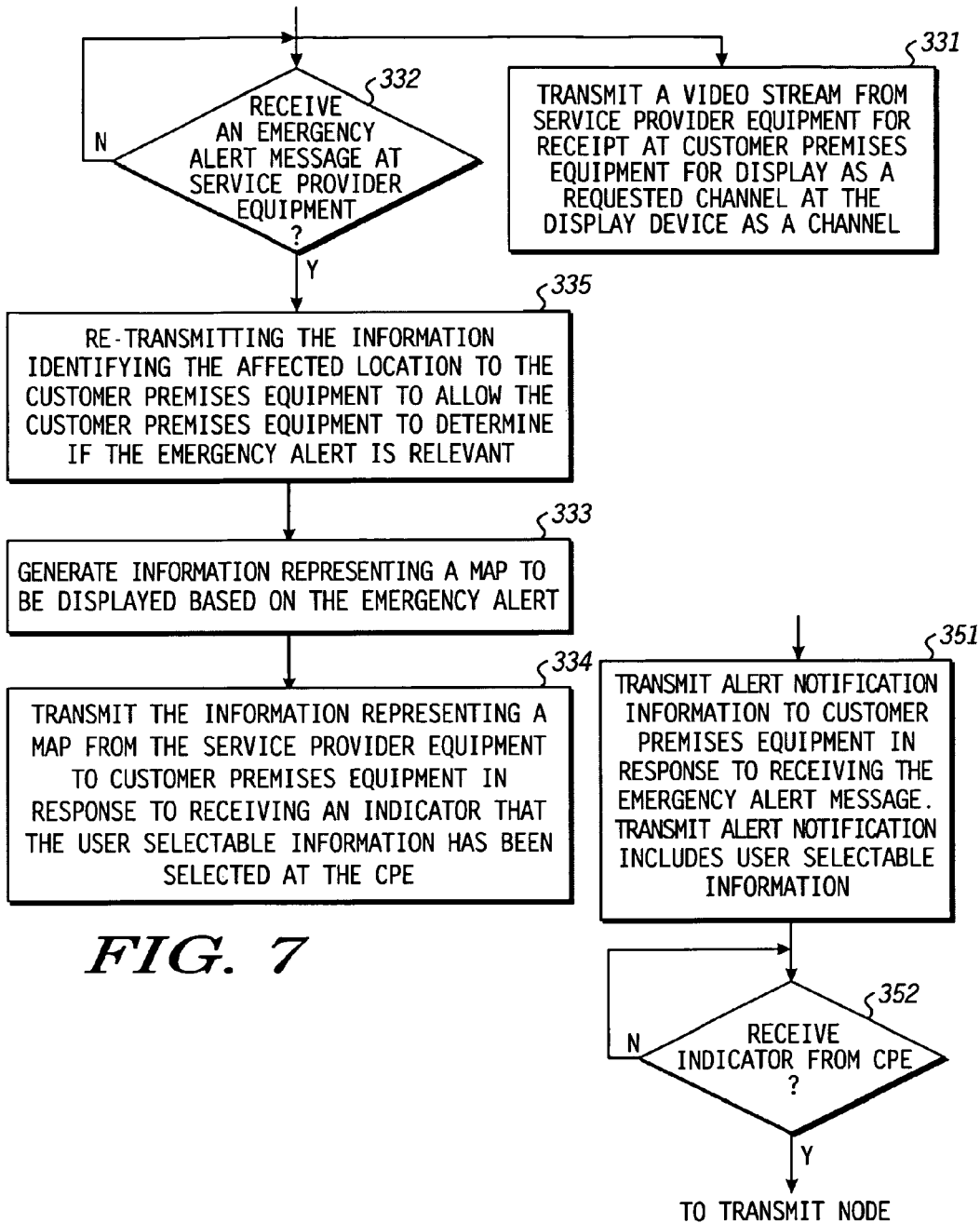

EMERGENCY ALERT REPRESENTATION

CROSS-REFERENCE TO RELATED APPLICATION(S)

This application is a continuation of U.S. patent application Ser. No. 12/330,046 filed Dec. 8, 2008 by Leonardo Velazquez, entitled "Emergency Alert Representation." All sections of the aforementioned application are incorporated herein by reference in its entirety.

FIELD OF THE DISCLOSURE

The present disclosure relates generally to communicating emergency alerts.

BACKGROUND

Television viewing is part of daily life for many people. The wealth of content available from television service providers allows many people to find entertaining and informative programming despite their varying interests. As a result, television also provides a source of communication for government officials to provide emergency alerts and information. Most emergency alerts pertain to a general geographic location within a television viewing area. Because television viewing areas can cover multiple locations, such as multiple counties, many viewers will receive emergency alerts that do not apply to them. Hence, there is a need for a system and method of communicating emergency alerts.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 7 is a flow diagram of a particular illustrative embodiment of a method of communicating emergency alerts;

FIG. 8 is a flow diagram of a particular illustrative embodiment of a method of communicating emergency alerts.

DETAILED DESCRIPTION OF THE DRAWINGS

Figure 1:
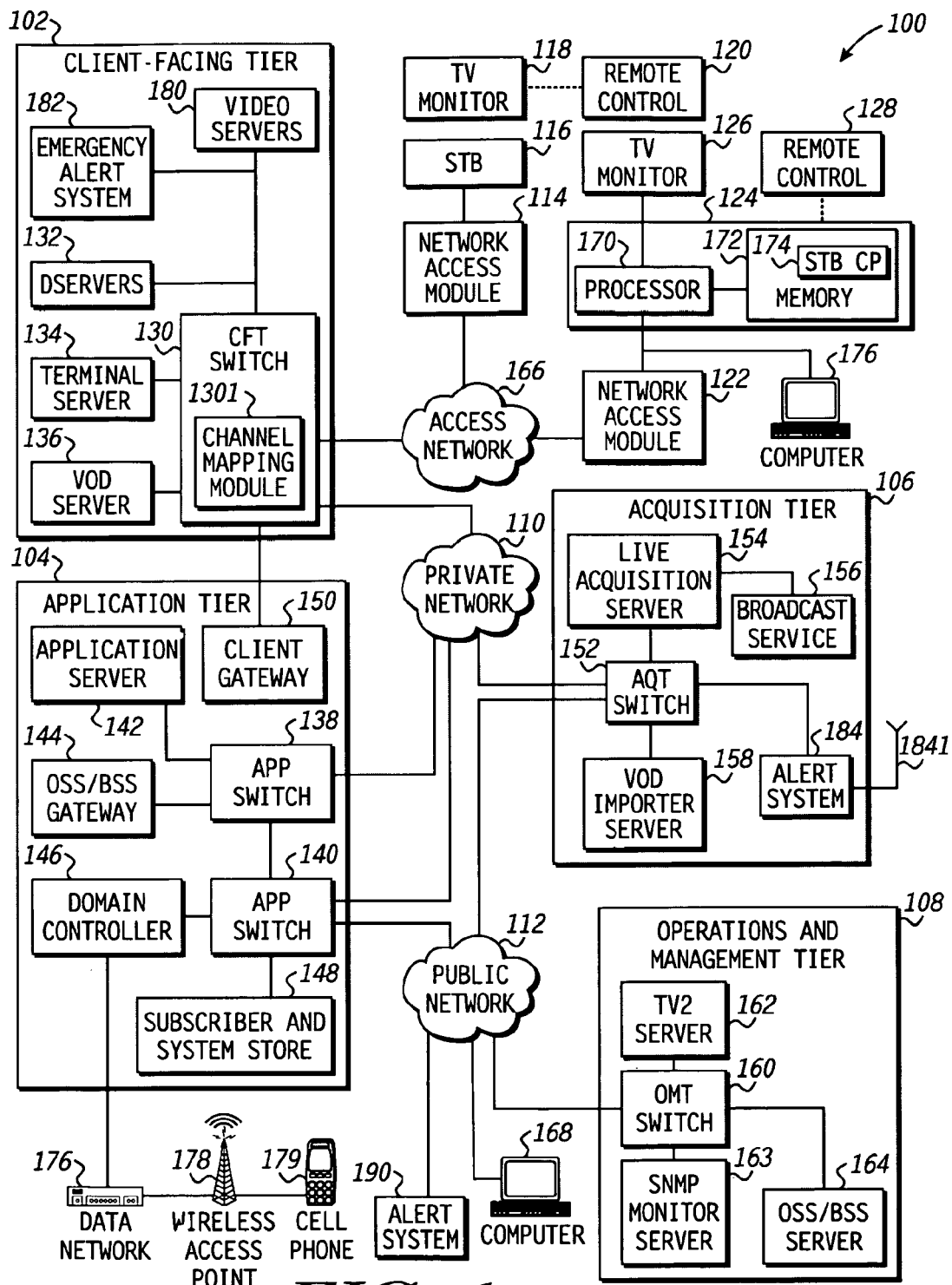
FIG. 1 is a block diagram of a particular illustrative embodiment of a system to communicate emergency alerts.

Referring to FIG. 1, an illustrative embodiment of an Internet Protocol Television (IPTV) system that may be used to communicate emergency alerts is illustrated and is generally designated 100. As shown, the system 100 can include a client facing tier 102, an application tier 104, an acquisition tier 106, and an operations and management tier 108. Each of tiers 102, 104, and 106 are illustrated as connected to a private network 110. Each of tiers 104, 106, and 108 are illustrated as connected to a public network 112, such as the Internet.

As illustrated in FIG. 1, the various tiers 102, 104, 106, and 108 communicate with each other via the private network 110 and the public network 112. For instance, the client-facing tier 102 can communicate with the application tier 104 and the acquisition tier 106 via the private network 1 10. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 represents service provider equipment (SPE) that can communicate with user equipment via an access network 166, such as an Internet Protocol Television (IPTV) access network. In an illustrative embodiment, customer premises equipment (CPE) includes network access modules 114 and 122 such as a local switch, router, or other device, that interfaces other customer premises equipment to of the access network 166. The client-facing tier 102 can communicate with a first representative set-top box device 116 at a first customer premises via the first network access module 114 and with a second representative set-top box device 124 at a second customer premises via the second network access module 122. In a particular embodiment, the network access modules 114 and 122 can communicate with computing devices at customer premises, such as the computing device 168 coupled to the second network access module 122. The network access modules 114 and 122 can include routers, local area network devices, modems, such as digital subscriber line (DSL) modems, any other suitable devices for facilitating communication between a set-top box device and the access network 166, or any combination thereof.

In a particular embodiment, the client-facing tier 102 can be coupled to the network access modules 114 and 122 via fiber optic cables. Alternatively, the network access modules 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116 and 124 can include: IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary embodiment, each set-top box device 116 and 124 can receive data, image information, or any combination thereof, from the client-facing tier 102 via the access network 166, where the image information can be processed for display at the display device 118 and 126 to which it is coupled. In an illustrative embodiment, the set-top box devices 16 and 124 can include tuners that receive and decode image information from television programming signals or packet streams that is to be transmitted to the display devices 118 and 126. Further, the set-top box devices 116 and 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 1.30 is coupled to one or more data servers, such as D-servers 132, that store, format, encode, replicate, or otherwise manipulate or prepare video content for communication from the client-facing tier 102 to the set-top box devices 116 and 124. The CFT switch 130 can also be coupled to a terminal server 134 that provides terminal devices with a connection point to the private network 110. In a particular embodiment, the CFT switch 130 can be coupled to a video-on-demand (VoD) server 136 that stores or provides VoD content imported by the IPTV system 100.

Further, the CFT switch 130 is coupled to one or more video servers 180 that receive video content and transmit the content to the set-top boxes 116 and 124 via the access network 166. In a particular embodiment, the CFT switch 130 can be coupled to one or more emergency alert system 182 that receive emergency alerts from an emergency alert system (EAS) receiver, such as an emergency alert system 184 and a emergency alert system 190, and send emergency alert messages that are based on the emergency alerts to the set-top box devices 116 and 124. CFT switch 130 includes a channel mapping module 1301, which uniquely identifies each packet stream, such as a video stream, being transmitted with a unique identifier.

In an illustrative embodiment, the client-facing tier 102 can communicate with a large number of set-top boxes, such as the representative set-top boxes 116 and 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116 and 124 via the access network 166, which enable the set-top box devices 116 and 124 to provide functions, such as display, messaging, processing of IPTV data and VoD material, etc. In an illustrative embodiment, the application server 142 can provide location information to the set-top box devices 116 and 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses of corresponding set-top box devices 116 and 124.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116 and 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VoD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116 and 124. The CFT switch 130 can receive content from the video server(s) 180 and communicate the content to the network access modules 114 and 122 via the access network 166. The set-top box devices 116 and 124 can receive the content via the network access modules 114 and 122, and can transmit the content to the television monitors 118 and 126. In an illustrative embodiment, video or audio portions of the content can be streamed to the set-top box devices 116 and 124.

Further, the AQT switch 152 can be coupled to a VoD importer server 158 that receives and stores television or movie content received at the acquisition tier 106 and communicates the stored content to the VoD server 136 at the client-facing tier 102 via the private network 110. Additionally, at the acquisition tier 106, the VoD importer server 158 can receive content from one or more VoD sources outside the IPTV system 100, such as movie studios and programmers of non-live content. The VoD importer server 158 can transmit the VoD content to the AQT switch 152, and the AQT switch 152, in turn, can communicate the material to the CFT switch 130 via the private network 110. The VoD content can be stored at one or more servers, such as the VoD server 136.

When users issue requests for VoD content via the set-top box devices 116 and 124, the requests can be transmitted over the access network 166 to the VoD server 136, via the CFT switch 130. Upon receiving such requests, the VoD server 136 can retrieve the requested VoD content and transmit the content to the set-top box devices 116,124 across the access network 166, via the CFT switch 130. The set-top box devices 116 and 124 can transmit the VoD content to the television monitors 118 and 126. In an illustrative embodiment, video or audio portions of VoD content can be streamed to the set-top box devices 116 and 124.

The AQT switch 152 can be coupled to an emergency alert system 184, such as an EAS off-air receiver that receives emergency alerts from a national weather service, an emergency broadcast system, or another emergency alert service. In an alternative embodiment, the alert system 184 can be coupled to the CFT switch 130, to the emergency alert system 182, or to the terminal server 134. An emergency alert system 190 can be coupled to the public network 112 to receive emergency alerts via the public network. Emergency alerts received at emergency alert system 184 or at emergency alert system 190 can be communicated to the emergency alert system 182 for further processing.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular illustrative embodiment, received emergency alert can be a weather alert, a civil defense alert, an Amber alert, a Presidential alert, or any other emergency alert. In a particular embodiment, the emergency alert can include information identifying one or more geometric shapes or geographic indicators, as discussed further herein. The emergency alert can also include information identifying the emergency, such as the type of emergency, a degree of urgency associated with the emergency, safety precaution instructions, other emergency alert information, or any combination thereof. Operation of the emergency alert system 182 will be better understood with reference to FIG. 2

Figure 2:
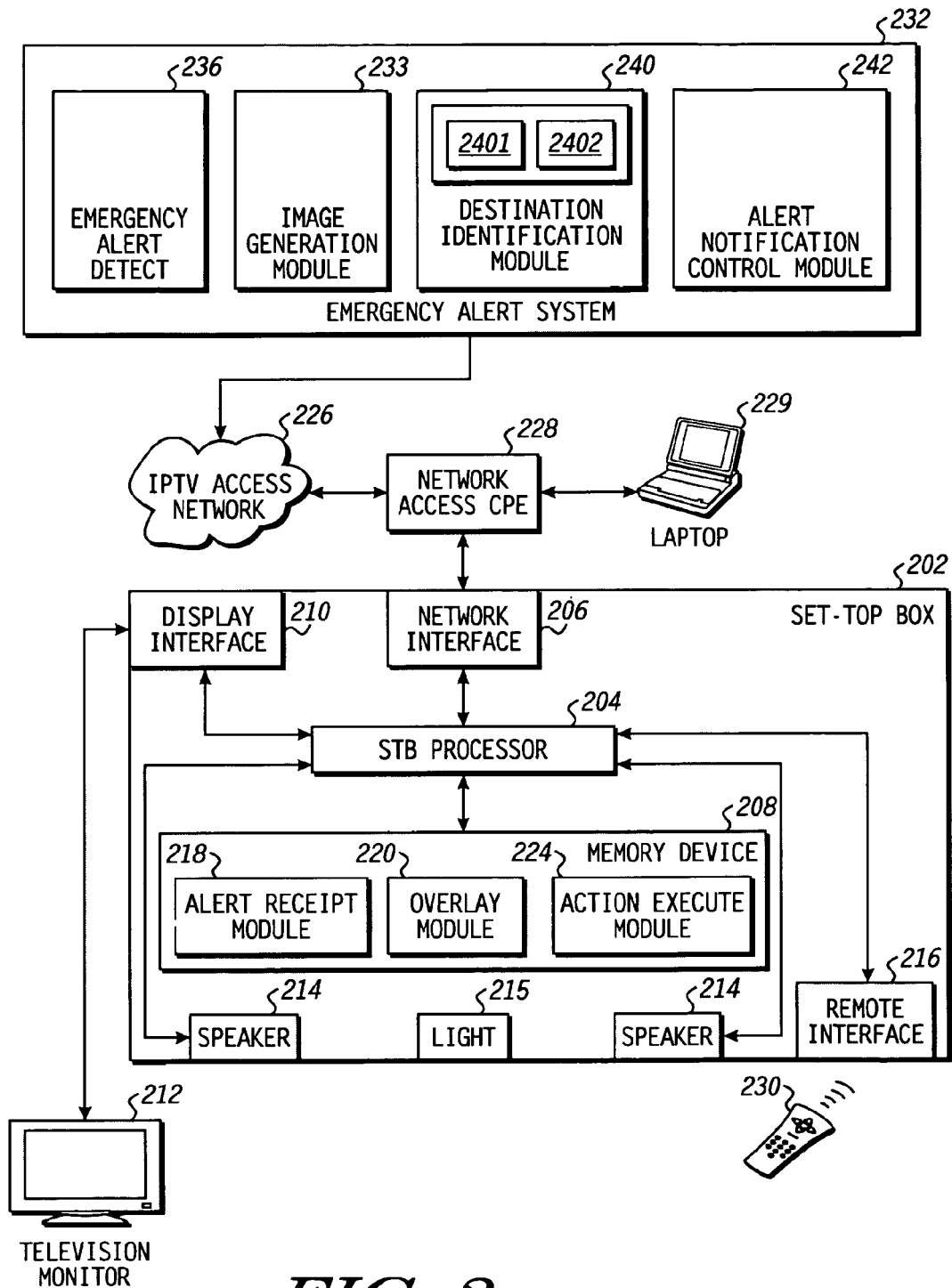
FIG. 2 is a block diagram of a portion of the block diagram of FIG. 1 in greater detail according to a illustrative embodiment.

FIG. 2 illustrates a specific embodiment of a system corresponding to a portion of the system of FIG. 1. FIG. 2 illustrates service provide equipment that includes an emergency alert processing system 232 illustrating a specific embodiment of a portion of the emergency alert system 182 of FIG. 1, an IPTV access network 226 that corresponds to the access network 166 of FIG. 1, and customer premises equipment including network access module 228, set-top box 202, general purpose computer 229, display device 212, and a remote control 230.

Emergency alert processing system 232 includes a set of emergency alert processing modules including an emergency alert detect module 236, an image generation module 238, a destination identification module 240, and an alert notification/control module 242.

Emergency alert detect module 236 monitors received information to determine when an emergency alert is received at the service provider equipment, for example, from one of the alert systems 184 and 190 illustrated at FIG. 1. A received emergency alert includes information identifying the emergency and information identifying a map location to which the identified emergency is relevant, also referred to herein as the affected area. The information identifying the affected area can include one or more primitive shapes, political regions, physical features, the like, and combinations thereof.

A primitive shape identifying a map location will be understood to be qualitatively different types of shape features that can be combined into an overall shape. Examples of primitive shapes include: straight edges; vertices; simple curves with no points of inflection (curve); complex curves with multiple points of inflection; and shapes having closed contours formed using other shapes, such as straight edges, vertices, simple curves, and complex curves. Simple shapes identifying map locations are associated with physical map locations using one or more latitudinal and longitudinal coordinates, and physical features.

Political regions show map locations based on political boundaries. Examples of political boundaries include boundaries for cities, counties, states, countries, and the like. Physical features such as mountains, rivers, lakes, roads, railroad tracks, buildings, and the like, are shown at their corresponding physical map locations.

The image generation module 238 of the emergency alert processing modules 235 generates information representing a map of the affected area that is to be displayed at a display device of the customer premises equipment. In one embodiment the image generation module 238 is a video generation module that generates a video stream illustrating a map that identifies the affected area. The information representing a map of the affected area can be a video stream representing renderable video data that can be accessed by a display engine of the customer premises equipment for display. For example, the image processing module can compress the video stream in an MPEG standard. The video stream can include information to display images that are based upon the primitive shape information identifying the affected area. Alternatively, information representing the map generated by the image generation module 238 can include information representing a still image of a map that is to be processed at the customer premises equipment to form a video image that can be displayed by a display engine, whereby the primitive shapes received in the emergency alert, can be included in the information describing the still image of the map.

The illustrated emergency alert processing system 232 includes a destination identification module 240 to identify customer premises equipment that is located within an affected area. For example, the emergency alert processing module 236 receives the emergency alert identifying the affected area and based upon the information identifying the affected area, the destination identification module 240 will identify specific customer premises equipment located within the affected area, such as the customer premises that includes network access module 114 (FIG. 1) and the customer premises location that includes network access module 122. Alternatively, the destination identification module 240 can generally identify a group of customer premises, such as all customer premises equipment within a service area. When the emergency alert information identifying the affected area includes primitive shapes associated with map locations, a geographic mapping module 2401 is used to determine which specific customer premises equipment locations are within a boundary defined by these primitive shapes, or which service areas are at least partially within the area defined by the boundary of the primitive shapes. Alternatively, a location code module 2402 can be used to correlate various customer premises equipment locations to location indicators received as part of the emergency alert. For example, a code corresponding to a specific political region can be used to determine which specific customer premises equipment locations are within, or partially within, an affected area based upon the code.

In response to the emergency alert detect module 236 determining that receiving an emergency alert, and the destination identification module determining which customer premises equipment affected by the emergency, an alert notification module 242 of the emergency alert processing system 232 transmits an emergency alert notification message to switch 230, which corresponds to switch 130 of FIG. 1, for transmission. The transmitted emergency alert notification message is for receipt at customer premises equipment. In one embodiment, the emergency alert notification message sent to the customer premises equipment includes user selectable information to generate a user selectable display field at a display device of the customer premises equipment that when selected will cause a specific action to be performed. For example, the user selectable information can be used by the set-top box of the customer premises equipment to generate a user selectable field, such as a button or highlighted text, to be displayed at a display device of the customer premises equipment. In response to a user activating the selectable display field, e.g. selecting the selectable display field, a defined action is performed at the customer premises equipment. The defined action can be specified by the user selectable information received from the service provider equipment, or by information defined at the customer premises equipment. For example, activating the selectable display field can result in the customer premises equipment displaying a video stream, either as primary video or as overlay video that includes the information representing the map of the affected area. Display of the video stream, in response to activating the selectable field, can occur as a result of the customer premises equipment sending a request to the service provider equipment for the video stream information, or as a result of the customer premises equipment processing a video stream currently being received.

As used herein, primary video is intended to mean video containing content intended to be displayed at a display device as a primary source of information. For example, primary video can be video associated with a real-time content broadcast, such as a regularly scheduled program or a VoD program, or the video can be associated with content being accessed from the customer premises equipment itself, such as playing a DVD or other stored content. The primary video is generally displayed at the request of a user. By contrast, overlay video is intended to for display along with primary video at a display device. For example, the primary video can be a movie being displayed at the display device along with overlay video, which, for example, can be displayed at a bottom portion of a the primary video.

The customer premises equipment of FIG. 2 includes a set-top box 202, general purpose computer 229, display device 212, and a remote control 230. The set-top box device 202 includes a STB processor 204 and memory device modules 208 accessible to the STB processor 204. The STB processor 204 can communicate with the IPTV access network 226, via the network interface 206. In a particular embodiment, network access module 228 can facilitate communication between the network interface 206 and the IPTV access network 226. The network access module 228 can include a router, a local area network device, a modem, such as a digital subscriber line (DSL) modem, any other suitable device for facilitating communication between the network interface 206 of the set-top box device 202 and the IPTV access network 226, or any combination thereof. Further, the STB 202 can communicate video content to a display device 212 via a display interface 210. In addition, the STB processor 204 can receive commands from a remote control device 230 via a remote interface 216.

Modules 206 pertaining to the processing of emergency alerts are illustrated to include an alert receipt module 218 that determines when an emergency alert has been received, an overlay module 220 to facilitate combining overlay video and primary video, and an action execute module 224. The overlay video can be received as a video stream identified as an overlay video stream, or as other image information identified as an image that when received at the customer premises equipment is converted into a overlay video stream before being processed by the overlay module 220 for display as an overlay video image.

In one embodiment, the emergency alert processing system 232 will only send relevant emergency alert information to the customer premises equipment, whereby the emergency receipt module 218 will detect all received emergency alert notifications as relevant and process them. Alternatively, the emergency receipt module 218 is responsible for determining if emergency alert messages that are broadcast by the service provide equipment are relevant to its location, e.g., determine whether the STB 202 is within the affected area.

Modules 206 further include an overlay module 220 that is configured to combine an overlay a video stream with a primary video stream. The overlay video can be received as a video stream identified as an overlay video stream, or as other image information identified as an image that when received at the customer premises equipment is converted into a overlay video stream before being processed by the overlay module 220 for display as an overlay video image.

The modules 206 include an action execute module 224 that is configured to monitor user actions at set-top box 202. For example, the action execute module 224 can determine when a selectable field emergency alert displayed at the display device has been selected by the user, and in response perform a defined action based upon the selection of the selectable field. As previously discussed, both the selectable field and the define action can be received from the service provider equipment as part of the emergency alert notification message. For example, the selectable field can be displayed as part of a video stream that also displays a small map to be overlaid at the bottom of a display device, where the map illustrates the area affected by the emergency alert and the selectable field indicates that more information is available. Selection of the selectable field by the user causes the action execute module 224 to perform a defined task associated with the selectable field. For example, the defined task can cause the STB 202 to change a channel to display a video stream illustrating a more detailed view of the affected area, to display a live weather report, or other information. Operation of the above emergency alert system of FIGS. 1 and 2 will be better understood with respect to the methods illustrated at FIGS. 3-9.

Figures 3, 4:
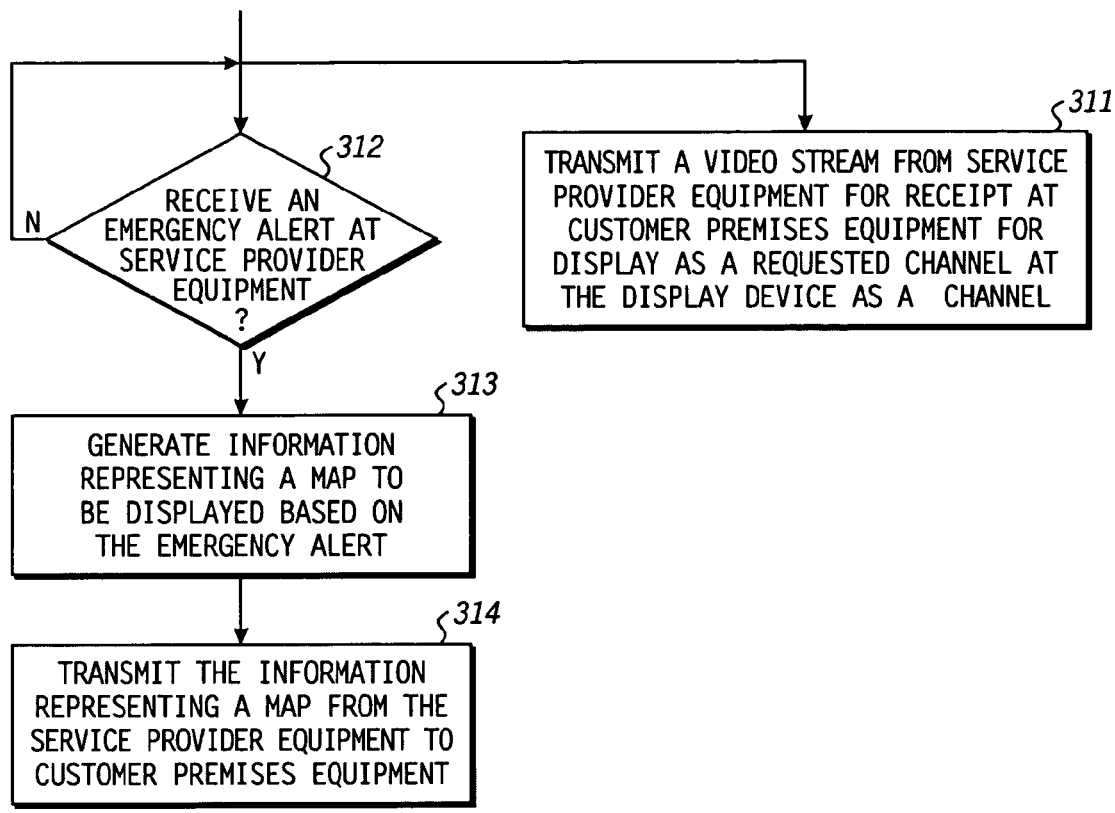
FIG. 3 is a flow diagram of a particular illustrative embodiment of a method of communicating emergency alerts.
FIG. 4 is a table representing information associated with an emergency alert.

FIG. 3 includes a flow diagram illustrating a method in accordance with the present disclosure. At node 311 a video stream is transmitted from service provider equipment for display at a customer premises display device. For example, in response to a user action at the customer premises equipment requesting primary multimedia content, such as a regularly scheduled program, a video stream associated with the requested program will be transmitted from the service provider equipment for display at a display device of the customer premises provider equipment. For example, referring to FIG. 2, the selection by a user at the customer premises equipment can occur through the use of remote 230 whereby the action execute module 224 would send a request to the client facing tier 102 (FIG. 1) over the IPTV access network 228, which is analogous to the private network 10 illustrated at FIG. 1, requesting specific primary content. As a result, the service provider equipment illustrated at FIG. 1 will transmit multimedia information, including a video stream, associated with the requested primary content program to the customer premises equipment.

At node 312, an emergency alert is received at the service provider equipment. For example, referring to FIG. 2, the emergency alert detect module 236 can receive an emergency alert from alert system 184 or alert system 190. As previously described, the emergency alert includes information identifying an emergency and information identifying an affected area, where the emergency is relevant to the affected area. The information identifying the affected area can be transmitted using a standardized protocol, such as the Common Alerting Protocol (CAP) and the Specific Area Message Encoding (SAME) protocol as adopted by the Federal Communications Commission as its weather radio service. The transmitted information can include Federal Information Processing Standards (FIPS) Codes that correspond to political regions, such as county and city boundaries. In addition, the emergency alert includes information identifying one or more primitive shapes corresponding to specific map locations. For example, a primitive shape, such as a parallelogram, circle, and the like, can be identified along with specific location information, such as latitudinal and longitudinal coordinates, that correlates a geographic area corresponding to the geometric primitive.

The table of FIG. 4 represents, in tabular form, specific information that can be received as part of an emergency alert. The reference numbers 501-505 and 511-518 in the first column represent information identifying specific political regions, such as cities and counties, respectively. The reference numbers 521-523 in second column represent information identifying specific primitive shapes that correspond to map locations in the same general region as the political regions identified at the first column. For example, identifier 521 can represent information, such as coordinates, or other information, representing a parallelogram, identifier 522 can represent a triangle, and identifier 522 can represent a circle.

Figure 5:
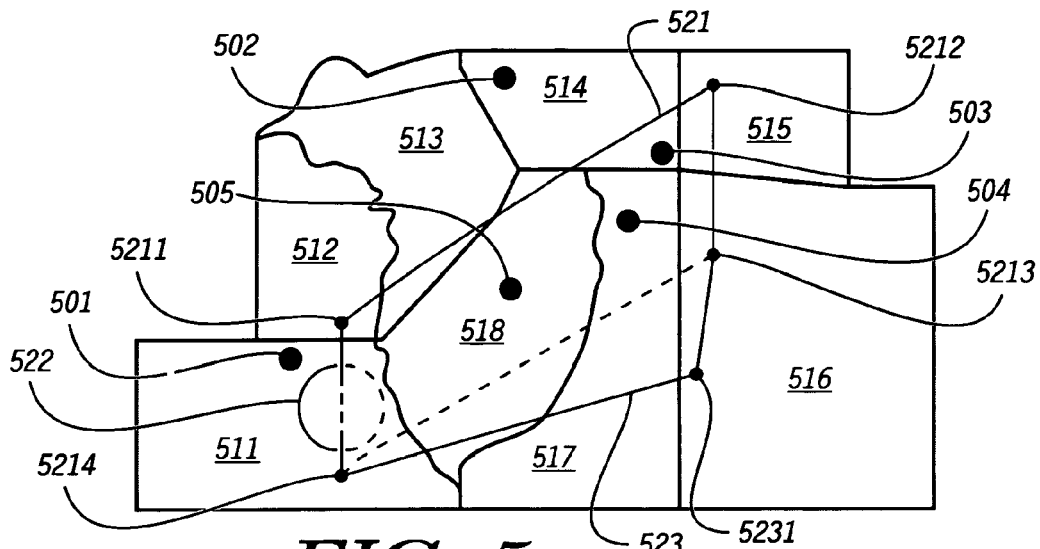
FIG. 5 is a political map including geometric shapes.

At node 313, information representing a map of the affected area is automatically displayed at the service provider equipment based upon the information identifying the affected location. For example, a video stream representing a map displaying a border defined by the primitive shapes as indicated at FIG. 4 can be generated by the image generation module 238 as previously described. FIG. 5 illustrates a map of the affected area that includes the cities and counties identified at the first column of the table of FIG. 4, and a border defined by the primitive shapes at the second column of the table of FIG. 4. Note that the parallelogram identified by indicator 521 of the table of FIG. 4 has vertices 5211, 5212, 5213, and 5214, the triangle defined by indicator 522 of the table of FIG. 4 has vertices 5231 and 5232, and the circle defined by indicator 522 of the table of FIG. 4 has a center location 5221 and radius dimension 5222.

At node 314, information representing a map of the affected area is transmitted from the service provider equipment for receipt at customer premises equipment. The information representing the map of the affected area can be integrated with a primary content program, e.g., the primary content video stream is modified at the service provider equipment to include an overlay map of the affected area, or the primary content video can be transmitted as a separate video stream from an overlay video stream, where the two video streams can be combined at the customer premises equipment. Note that the overlay video can be sent to customer premises equipment for overlay with primary content generated at the customer premises equipment, such as primary content associated with play back of a digital video recorder, or other VoD, through the set-top box 202 (not illustrated).

Figure 6:
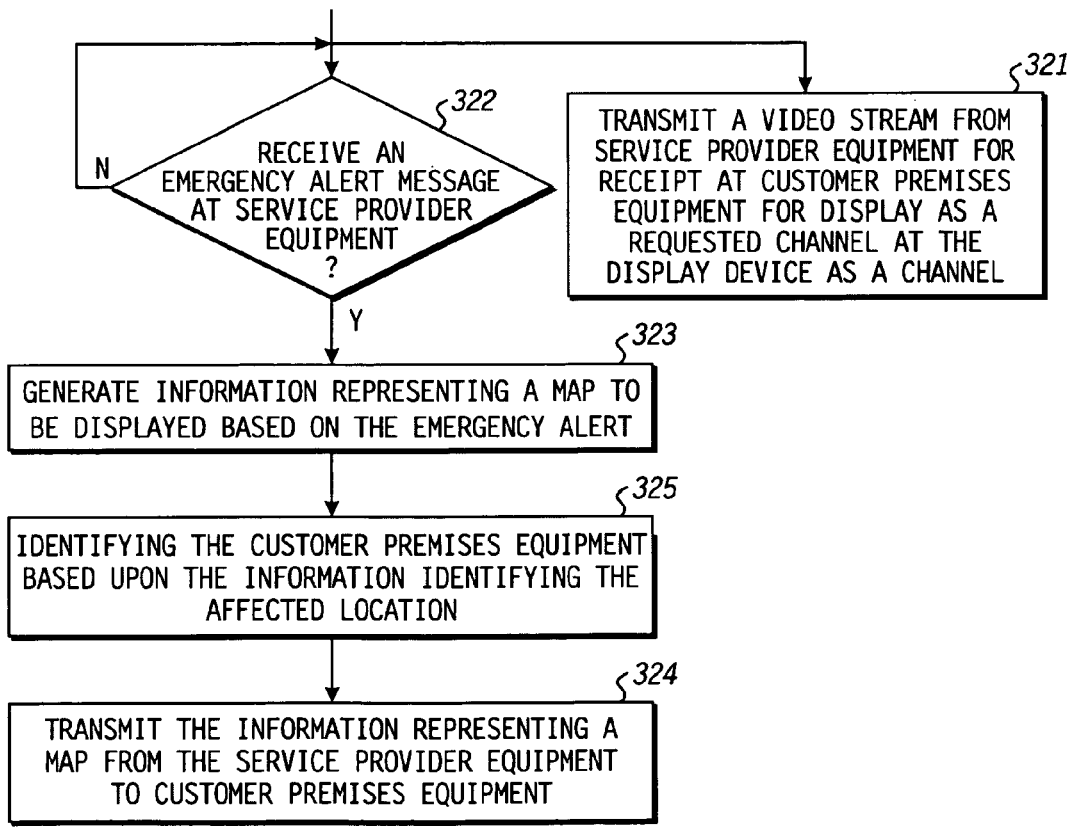
FIG. 6 is a flow diagram of a particular illustrative embodiment of a method of communicating emergency alerts.

FIG. 6 illustrates a flow diagram illustrating a method in accordance with a specific embodiment of the present disclosure. At node 321 a video stream is transmitted from service provider equipment for display at a customer premises display device in a similar manner as previously described at node 311. At node 322, an emergency alert is received at the service provider equipment in a similar manner as previously described at node 312. At node 323 information representing a map of the affected area is generated based upon the information identifying the affected location in a similar manner as previously described at node 313

At node 325, the service provider equipment, identifies customer premises equipment within the affected area based upon the emergency alert information. For example, as previously described, the destination identification module 240 can identify customer premises equipment within an affected area. Such an identification can be made by knowing the customer premises equipment is within a political region identified by information associated with the emergency alert, or by determining that the customer premises equipment is within a primitive shape identified by information associated with the emergency alert. Having the destination identification module 240 automatically, e.g., in response to receiving an emergency alert, identifies customer premises equipment based upon geometric shapes allows for emergency alert information to be transmitted to specific customer premises equipment with greater resolution than prior methods of transmitting emergency alerts.

At node 335, the information representing the map of the affected area is transmitted from the service provider equipment for receipt at the customer premises equipment identified at node 325.

FIG. 7 illustrates a flow diagram illustrating a method in accordance with a specific embodiment of the present disclosure. At node 331 a video stream is transmitted from service provider equipment for display at a customer premises display device in a similar manner as previously described at node 311. At node 322, an emergency alert is received at the service provider equipment in a similar manner as previously described at node 312.

At node 325, emergency alert information identifying the affected location is re-transmitted from the service provider equipment to the customer premises equipment to allow the customer premises equipment to determine locally if the emergency alert is relevant to its location. For example, the alert receipt module 218 can be configured to receive the re-transmitted information to determine if an associated emergency alert is relevant to its location. In response to determining whether an alert is relevant, the alert receipt module can provide a request for further information back to the service provider equipment, or perform a defined action, such as receive a broadcast video stream for display as an overlay over the primary video stream.

At node 333 information representing a map of the affected area is generated based upon the information identifying the affected area in a similar manner as previously described at node 313. At node 334 the graphical geographic information is transmitted from the service provider equipment for receipt at customer premises equipment in a similar manner as previously described.

FIG. 8 illustrates a flow diagram representing a specific embodiment whereby user selectable information is also transmitted. The flow of FIG. 8 can be integrated into the flows of FIGS. 3, 7 and 8, previously described. For example, the flow of FIG. 8 can be implemented prior to transmitting information as described at nodes 314, 324, and 334 as previous described at FIGS. 3, 6, and 7, respectively.

At node 351, information is transmitted to the customer premises equipment from the service provider equipment that provides for the customer premises equipment to generate a user selectable action on a display device of the customer premises equipment. At the customer premises equipment, in response to the user selecting a field at the display device corresponding to the user selectable action, the customer premises equipment will execute a defined action. For example, the defined action can result in the customer premises equipment providing a return request to the service provider equipment for additional information. For example, the customer premises equipment can request that the information representing the map may be transmitted to the customer premises equipment.

At node 352, the service provider equipment determines whether an indicator has been received from the customer premises equipment in response to the user selectable action being activated. In response to the indicator being received, flow remains at node 352 for further monitoring. Otherwise, flow proceeds to a next node within a flow chart. Thus it will be appreciated that information representing the map can be transmitted in response to a request from customer premises equipment.

Figure 9:
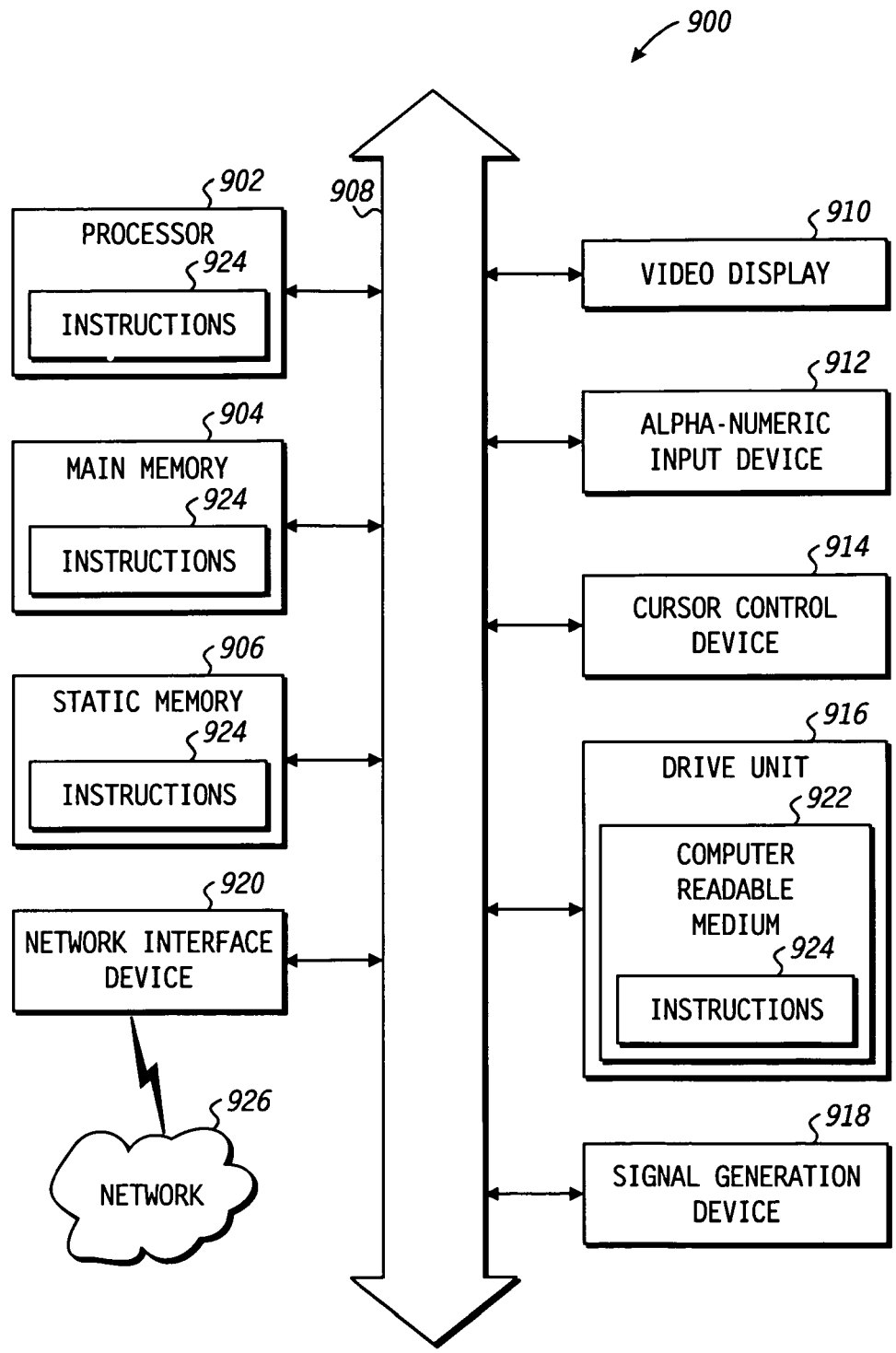
FIG. 9 is a diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900, or any portion thereof, may operate as a standalone device or may be connected, e.g., using a network, to other computer systems or peripheral devices, including customer premises equipment or service provider equipment, as shown in FIGS. 1-2.

In a networked deployment, the computer system may operate in the capacity of an IPTV server, such as a video server or multicast alert server, or a set-top box device. The computer system 900 can also be implemented as or incorporated into various devices, such as an emergency alert system (EAS) receiver, a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication.

As illustrated in FIG. 9, the computer system 900 may include a processor 902, e.g., a central processing unit (CPU), a graphics-processing unit (GPU), other processing units, and combinations thereof. Moreover, the computer system 900 can include a main memory 904, which can be dynamic memory, and a static memory 906 that can communicate with each other via a bus 908. As shown, the computer system 900 may further include a display device 910, such as a liquid crystal display (LCD), an organic light emitting diode (OLED), a flat panel display, a solid state display, a cathode ray tube (CRT), the like, and combinations thereof. Additionally, the computer system 900 may include an input device 912, such as a keyboard, and a cursor control device 914, such as a mouse. Further, the computer system 900 can include a wireless input device 919, e.g., a remote control device. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, instructions for execution by a processor or that cause a computer system to perform any one or more of the methods or operations disclosed herein.

In a particular embodiment, the computer-readable medium can include a solid-state memory such as a memory card or other package that houses one or more non-volatile read-only memories. Further, the computer-readable medium can be a volatile or non-volatile memory; or a re-writable or a one-time writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in other embodiments, an emergency alert receiver may actually be associated with the emergency alert detect portion 236 of FIG. 3 as opposed, or in addition to receivers associated with the alert system 184 of FIG. 1.

Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

receiving an emergency alert at service provider equipment including a processor, wherein the emergency alert comprises information identifying an emergency and information identifying an affected area, wherein the information identifying the affected area comprises a code identifying a political region and information identifying a primitive shape corresponding to the affected area, and wherein the emergency is relevant to the affected area;

generating, by the service provider equipment, first information representing a map of the affected area identified in the emergency alert to be displayed at a display device of customer premises equipment;

authenticating, by the service provider equipment, the customer premises equipment;

transmitting, by the service provider equipment, a first video stream comprising the first information, a user-selectable display field and a definition of an action associated with the user-selectable display field from the service provider equipment to the customer premises equipment for presentation at a first channel of the display device, wherein the customer premises equipment is operable to determine if the first information is relevant to a location of the customer premises equipment and to condition the presentation of the first information representing the map of the affected area together with the user-selectable display field at a display area of the display device responsive to the determination if the first information is relevant to the location, wherein the definition of the action comprises a task performable by the customer premises equipment;

receiving, by the service provider equipment, from the customer premises equipment an indication of a selection of the user-selectable display field and a request for a second video stream associated with the emergency and the affected area, wherein the selection of the user-selectable display field causes the customer premises equipment to perform the action to execute the task based on the definition; and responsive to the indication of the selection of the user-selectable display field and the request, transmitting, by the service provider equipment, to the customer premises equipment the second video stream associated with the emergency and the affected area for presentation at a second channel of the display device without displaying, at the second channel, video content already being received by the customer premises equipment, wherein the first information is to be displayed as overlay video with the first video stream, wherein the overlay video provides a map of the affected area, wherein the map occupies a portion of the display area of the display device, and wherein the map is to be displayed together with the user-selectable display field indicating that more information is available in relation to the emergency, and wherein the task comprises changing a channel at a set-top box of the customer premises equipment to display a video stream illustrating a more detailed view of the affected area.

2. The method of claim 1, wherein the first video stream is transmitted as a multicast packet stream from the service provider equipment to the customer premises equipment.

3. The method of claim 1, wherein the first video stream is transmitted in response to identifying the customer premises equipment based upon the code identifying the political region and the information identifying the primitive shape corresponding to the affected area.

4. The method of claim 1, further comprising, capturing the emergency alert at the service provider equipment from a source, wherein the user-selectable display field comprises one of a button or highlighted text.

5. The method of claim 1, wherein the customer premises equipment comprises equipment selected from the group consisting of network access modules, switches, routers and combinations thereof.

6. The method of claim 1, further comprising, identifying the customer premises equipment based upon the code identifying the political region and the information identifying the primitive shape corresponding to the affected area.

7. The method of claim 1, wherein the first information represents information that is displayable by a display engine of the customer premises equipment, wherein the first information includes a map of the affected area, wherein the user-selectable display field indicates additional information is available.

8. A device comprising:
a memory to store executable instructions; and
a controller coupled to the memory, wherein the controller, responsive to executing the instructions, facilitates performance of operations comprising:

determining that an emergency alert message has been received, the emergency alert message including information identifying an affected area affected by an emergency;

generating first information representing a map of the affected area according to the information of the emergency alert message identifying the affected area, wherein the information identifying the affected area comprises a code identifying a political region and a primitive shape corresponding to the affected area;

authenticating customer premises equipment;

providing a first data stream to customer premises equipment, wherein the first data stream includes the first information representing the map of the affected area and includes a user-selectable display field and a definition of an action associated with the user-selectable display field and wherein the customer premises equipment is operable to present the first data stream at a first television channel portraying the map of the affected area together with the user-selectable display field, wherein the definition of the action comprises a task performable by the customer premises equipment;

receiving from the customer premises equipment an indication of a selection of the user-selectable display field and a request for a second data stream associated with the emergency and the affected area, wherein the selection of the user-selectable display field causes the customer premises equipment to perform the action to execute the task based on the definition; and responsive to the receiving of the indication of the selection of the user-selectable display field and the request, providing to the customer premises equipment a second data stream associated with the emergency and the affected area, wherein the customer premises equipment is operable to present the second data stream on a second television channel, wherein the first information is to be displayed as overlay video with the first data stream, wherein the overlay video provides a map of the affected area, wherein the map occupies a portion of a display area of the customer premises, and wherein the map is to be displayed together with the user-selectable display field indicating that more information is available in relation to the emergency, and wherein the task comprises changing a channel at a set-top box of the customer premises equipment to display content of another data stream illustrating a more detailed view of the affected area.

9. The device of claim 8, wherein the map of the affected area is a primary video.

10. The device of claim 8, wherein the customer premises equipment comprises equipment selected from the group consisting of network access modules, switches, routers and combinations thereof.

11. The device of claim 8, wherein the operations further comprise, identifying the customer premises equipment based upon the code identifying the political region and the primitive shape corresponding to the affected area.

12. The device of claim 11, wherein the operations further comprise, transmitting a notification request to the customer premises equipment in response to identifying the customer premises equipment.

13. The device of claim 12, wherein the notification request includes the user-selectable display field.

14. The device of claim 8, wherein the user-selectable display field indicates additional information is available.

15. A machine-readable storage device comprising a plurality of instructions, which responsive to being executed by a processor, cause the processor to perform operations comprising:

generating first information representing a map of an affected area to be displayed based upon receiving emergency alert information identifying the affected area, wherein the information identifying the affected area comprises a code identifying a political region and a primitive shape corresponding to the affected area;

authenticating customer premises equipment;

transmitting a first data stream including the first information, a user-selectable display field and a definition of an action associated with the user-selectable display field to customer premises equipment for presentation as a first television channel of a display device portraying the map of the affected area together with the user-selectable display field, wherein the definition of the action comprises a task performable by the customer premises equipment;

receiving from the customer premises equipment an indication of a selection of the user-selectable display field and a request for a second video stream associated with the emergency and the affected area, wherein the selection of the user-selectable display field causes the customer premises equipment to perform the action to execute the task based on the definition; and responsive to the receiving of the indication of the selection of the user-selectable display field and the request, providing to the customer premises equipment a second data stream associated with the emergency and the affected area, wherein the first information is presentable at a display as an overlay, wherein the overlay provides a map of the affected area, wherein the map occupies a portion of the display, and wherein the map is presentable at the display together with the user-selectable display field indicating that more information is available in relation to the emergency, and wherein the task comprises changing a channel at the customer premises equipment to present at the display a more detailed view of the affected area.

16. The machine-readable storage device of claim 15, wherein the operations further comprise, receiving the first information representing the map to determine a set of customer premises equipment that includes the customer premises equipment.

17. The machine-readable storage device of claim 16, wherein the operations further comprise, transmitting a notification request to the set of customer premises equipment in response to a destination identification module determining the customer premises equipment, wherein the customer premises equipment comprises equipment selected from the group consisting of network access modules, switches, routers and combinations thereof.

18. The machine-readable storage device of claim 15, wherein the operations further comprise, identifying the customer premises equipment based upon the code identifying the political region and the primitive shape corresponding to the affected area.

19. The machine-readable storage device of claim 15, wherein the user-selectable display field indicates additional information is available.

20. The machine-readable storage device of claim 15, wherein the operations further comprise, capturing the emergency alert from a source, wherein the user-selectable display field comprises one of a button or highlighted text.

* * * * *